E. H. SCHMIDT.
CENTERING DEVICE FOR CAR COUPLINGS.
APPLICATION FILED SEPT. 11, 1909.
1,022,334.
Patented Apr. 2, 1912.
2 SHEETS—SHEET 2.
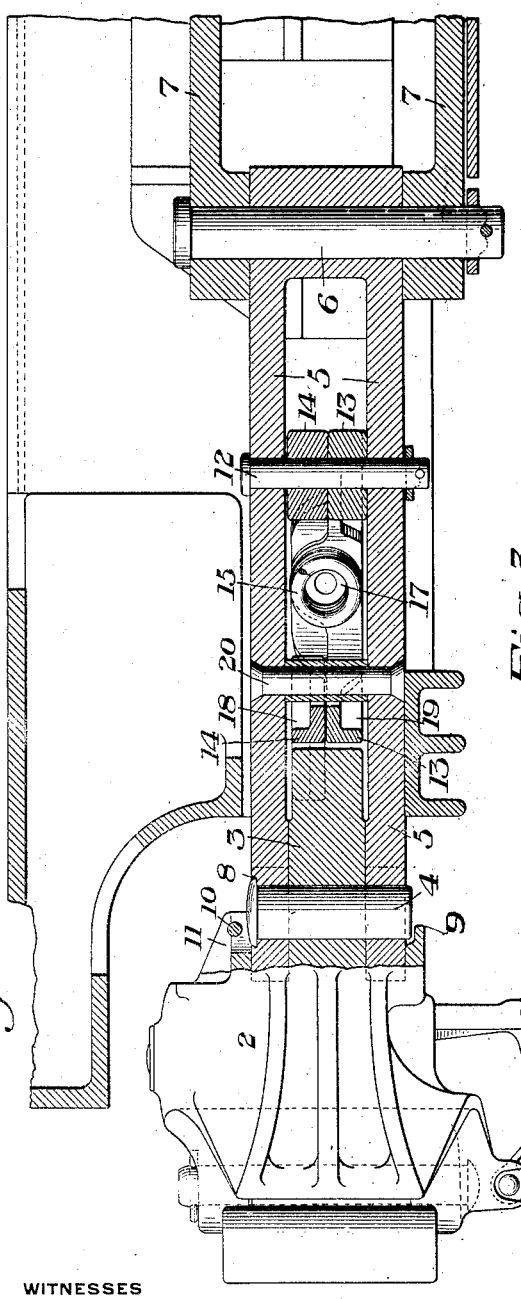
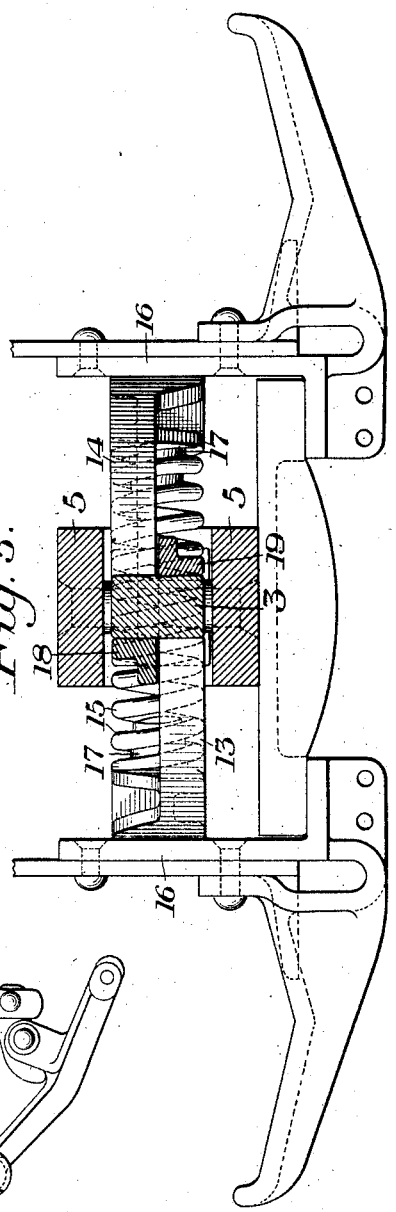
WITNESSES
INVENTOR

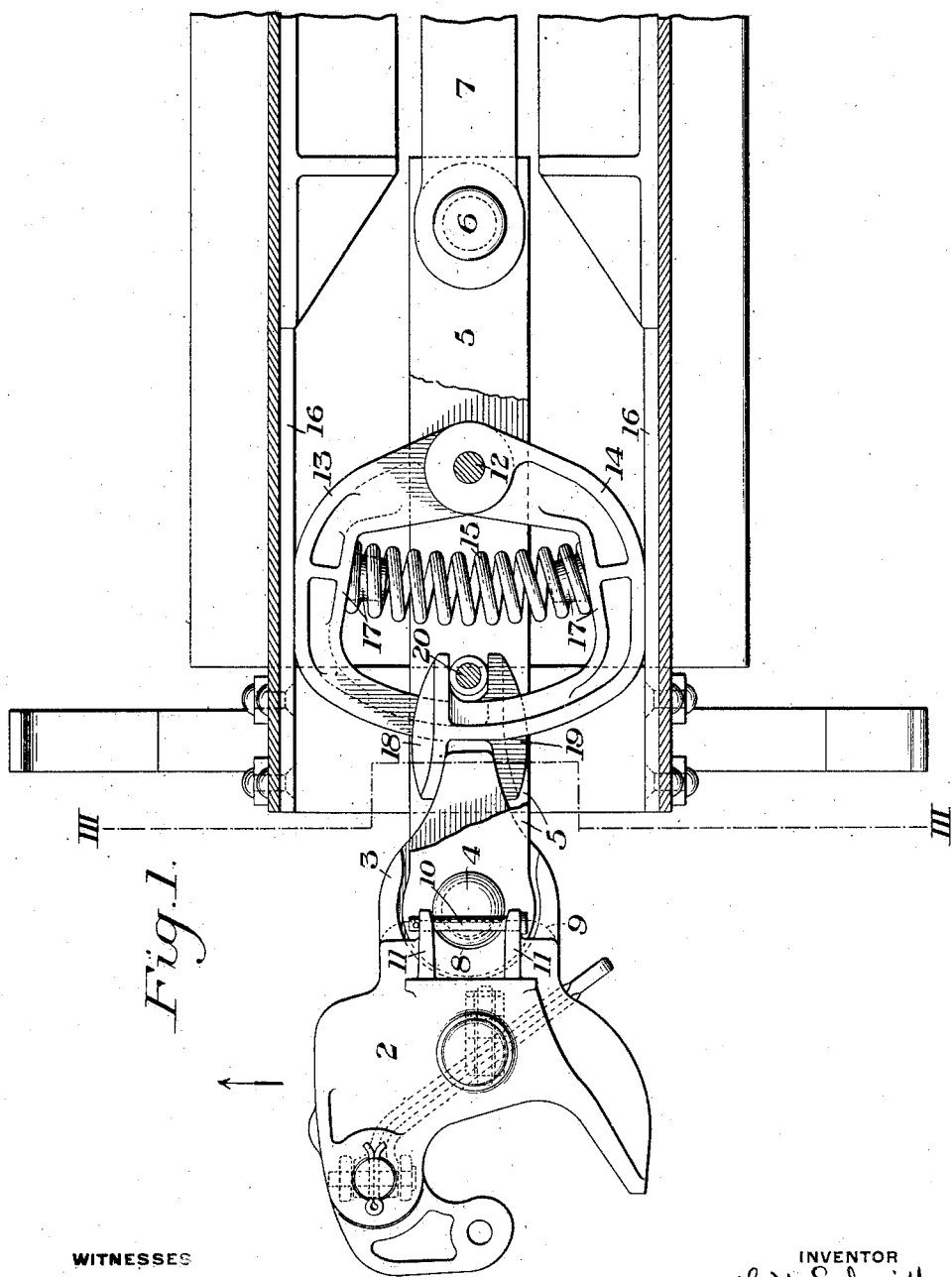

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

CENTERING DEVICE FOR CAR-COUPLINGS.

1,022,334. Specification of Letters Patent. Patented Apr. 2, 1912.

Application filed September 11, 1909. Serial No. 517,306.

*To all whom it may concern:*

Be it known that I, ERNEST H. SCHMIDT, of Cleveland, Cuyahoga county, Ohio, have invented a new and useful Centering Device for Car-Couplers, of which the following is a full, clear, and exact description, reference being had to the accompanying drawings, forming part of this specification, in which—

Figure 1 is a top plan view partially broken away, showing the device in position between the sills of a car and in connection with a coupler and a shank extension; Fig. 2 is a view partly in vertical section and partly in side elevation; Fig. 3 is a section on the line III—III of Fig. 1.

My invention has relation to centering devices for car couplers, and is designed to provide a simple and efficient device for maintaining the alinement between the coupler, its shank extension and the draft rigging yoke, as soon as forces tending to change this alinement cease to act.

The nature of my invention will be best understood by reference to the accompanying drawings, in which I have shown the preferred embodiment thereof and which will now be described, it being premised, however, that various changes may be made in the details of construction and arrangement of the parts by those skilled in the art, without departing from the spirit and scope of my invention, as defined in the appended claims.

In these drawings, the numeral 2 designates a coupler of the automatic type, having a shank 3, which is pivotally attached by means of a pin 4, to a coupler shank extension 5. This shank extension is, in turn, pivoted at 6 to the yoke 7 of the draft gear. The pin 4 is prevented from dropping out by a head at its upper end, which is recessed slightly into the upper member of the coupler shank extension, as shown at 8, in Fig. 2, and also by a projecting lug 9, on the lower part of the coupler head, which extends partially underneath the lower end of the pin. It is also prevented from being accidentally withdrawn upwardly from its position by means of a transverse pin or bolt 10, which is placed in position, as shown, after the pin 4 has been inserted. This pin 10 is seated in rearwardly projecting lugs or arms 11 of the coupler head. The lug or projection 9, together with the arms or lugs 11, forms a cage for the front ends of the upper and lower members of the coupler shank extension, thus preventing them from spreading apart and allowing the coupler head to droop. The pin connections 4 and 6 permit a certain amount of rotation of the coupler and the coupler shank extension, respectively, in a horizontal plane. The rotary movement about the pin 4 permits of a greater angling of the couplers than would be allowed by the M. C. B. contour, if the couplers were rigid, while the pivotal movement about the pin 6 permits the couplers to pass around curves without binding or distorting the yoke.

The centering device, proper, which constitutes the main feature of my invention, is pivoted by means of a vertical pin 12 between the upper and lower members of the coupler shank extension. This device consists of the two centering arms 13 and 14, together with an interposed spring 15. These arms, together with the spring, lie between the upper and lower members of the coupler shank extension, and are so arranged as will be hereinafter more fully described, as to perform a centering function both for the coupler head relative to the shank extension, and for the shank extension relative to the longitudinal center line of the car. The two centering arms 13 and 14 are each of C-shape, and are pivoted at their rear ends on the pin 12. The outer curved sides of these arms are in sliding contact with the inner faces of the draft sills 16, as shown in Fig. 1, and are held in such contact by proper initial compression of the centering spring 15. This spring is held in position between and against the centering arms by means of the bosses 17 on said arms. The forward end portions of the two arms overlap each other and both arms terminate in similarly shaped shoes 18 and 19, the shoe 18 being preferably integral with the arm 14, and the shoe 19 being preferably integral with the arm 13. The forwardly projecting portions of these shoes embrace and engage the tapered rear end portion of the coupler shank, while the rearwardly projecting portions of the shoes embrace and engage a pin or rivet 20, which passes through the coupler shank extension.

The operation is as follows: If the coupler head 2 is forced, say, in the direction of the arrow in Fig. 1, its shank will move in the opposite direction and will press against the shoe 19, thereby moving the centering arm 13 in a similar direction about the pin or pivot 12. This movement compresses the centering spring 15, the arm 14 in the meantime remaining substantially immovable against the sill with which it is in contact. When the force has been removed from the coupler head, the spring 15 will return to its normal compression, thereby forcing the arm 13 back in contact with its sill and by means of the contact between the shoe 19 and the coupler shank, will force the coupler back into alinement with the coupler shank extension. The movement of the coupler head in the opposite direction is resisted in a similar manner by the centering arm 13 and spring 15. If the coupler shank extension is forced to move, say, in the direction of the arrow, the bearing of the pin or rivet 20 against the rearwardly projecting portion of the shoe 18 moves the centering arm 14 in the same direction and compresses the spring 15. As soon as the force which has been so acting is removed, the spring returns the centering arm 14 to its normal position, and the contact of this arm with the pin or rivet 20 returns the shank extension to the longitudinal center line of the car. The arm 13 and spring 15 act in a similar manner when the coupler shank extension is forced to move in the opposite direction. The movements of the coupler and of the shank extension can take place either separately or simultaneously, the spring 15 performing a centering function for both of these members; and notwithstanding the double jointed connection of the coupler and yoke, the alinement between the two is maintained as soon as the forces tending to change such alinement cease to act.

The device is simple in its construction and requires but a few parts. The shape and location of the centering arms permits the use of a straight coupler shank extension, without offset on its under side, thus avoiding the necessity for dropping the carrying iron below its normal position. The centering device is placed back between the sills out of the way, so that there are no projections beyond the ends of the sills, and the device, from the end of the car, appears as compact as if a solid shank extension without a centering device were used. The direct sliding contact of the centering arms with the sills permits of all necessary longitudinal movements of the draft rigging in buffing and draft action.

It will be obvious that many changes may be made in the details of the construction and arrangement of the parts. Thus, the form of the centering arms, their manner of engaging with the coupler shank and with the shank extension may be changed, and other changes may be made.

I claim:—

1. A coupler having a shank, a shank extension to which the coupler is pivoted, a draft rigging to which the shank extension is pivoted, and a yielding centering device pivotally connected with the shank extension in the rear of the pivotal point of the coupler and in front of the pivotal point of the shank extension, said centering device having a sliding contact with portions of the car and engaging the coupler shank, to center both the coupler and the shank extension.

2. A coupler, a pivoted shank extension to which the coupler is pivotally connected, a pair of centering arms pivotally attached to the shank extension and having a sliding contact at their sides with the car sills, said arms having shoe portions at their free ends which engage the coupler shank in rear of its pivot and also the coupler shank extension forward of its pivot, together with a centering spring arranged to act upon said arms.

3. A coupler, a pivoted shank extension to which the coupler is pivoted, the coupler having a shank extending back of its pivotal connection with the shank extension, and yielding centering arms pivoted to the shank extension in the rear of the coupler pivot and having a sliding contact with the car sills, said arms engaging the rear end portion of the coupler shank.

4. A pivoted coupler shank extension formed of upper and lower members, a coupler pivoted between said members and having a shank extending rearward of the pivot, centering arms pivoted between said upper and lower members and having a sliding contact with the car sills, said arms having their free end portions overlapping each other and provided with shoe portions, said shoe portions engaging with opposite sides of the extension of the coupler and also engaging with opposite sides of a bearing on the shank extension, and a centering spring between said arms and acting thereon.

5. In car coupler mechanism, a pivoted coupler shank extension, a coupler, and a pivot pin connecting the coupler and the shank extension, the coupler having a rearward projection beneath the lower end of said pin and also having a free removable guard member extending transversely over the upper end of the pivot pin.

6. A coupler, a shank extension to which the coupler is pivoted and which is itself pivoted to the draft rigging, and a centering device engaging the shank of the coupler and also the shank extension, and acting to tend to maintain the alinement of the parts, said device being pivoted to the shank extension at a point between the pivotal point of the coupler and the pivotal point of the shank extension and being located entirely behind the front of the end sills of the car.

In testimony whereof, I have hereunto set my hand.

ERNEST H. SCHMIDT.

Witnesses:
 CHESTER K. BROOKS,
 HARRY E. ORR.